July 21, 1964  J. K. GAUNT ETAL  3,141,281
MACHINES FOR HARVESTING TALL ROW CROPS
Filed Dec. 28, 1959  6 Sheets-Sheet 1

Inventors
JAMES KENNETH GAUNT &
PERCIVAL CHARLES STEPHENS
By
Attorney

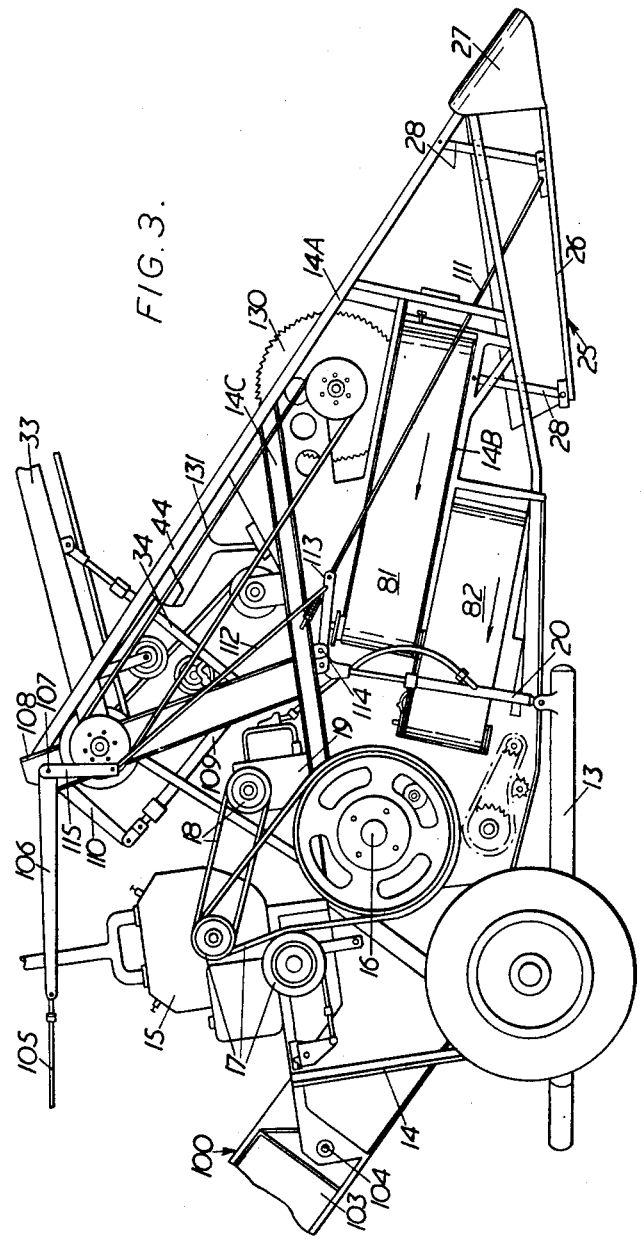

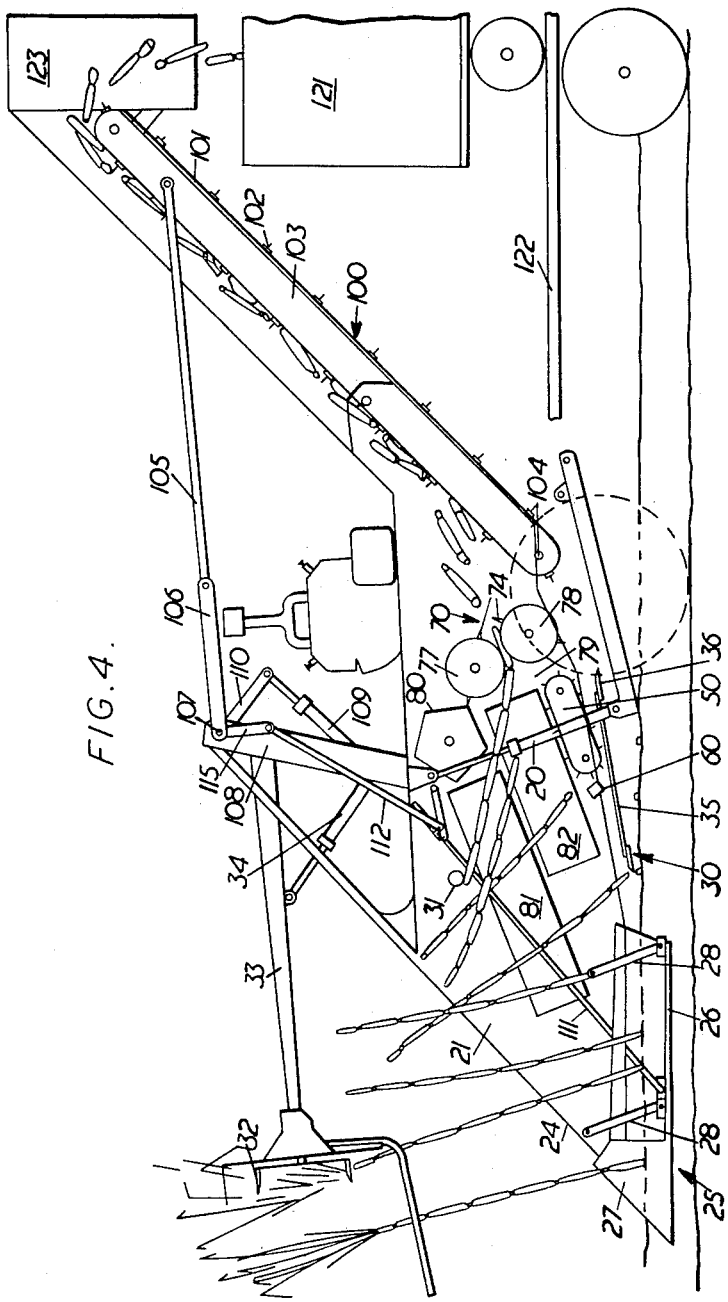

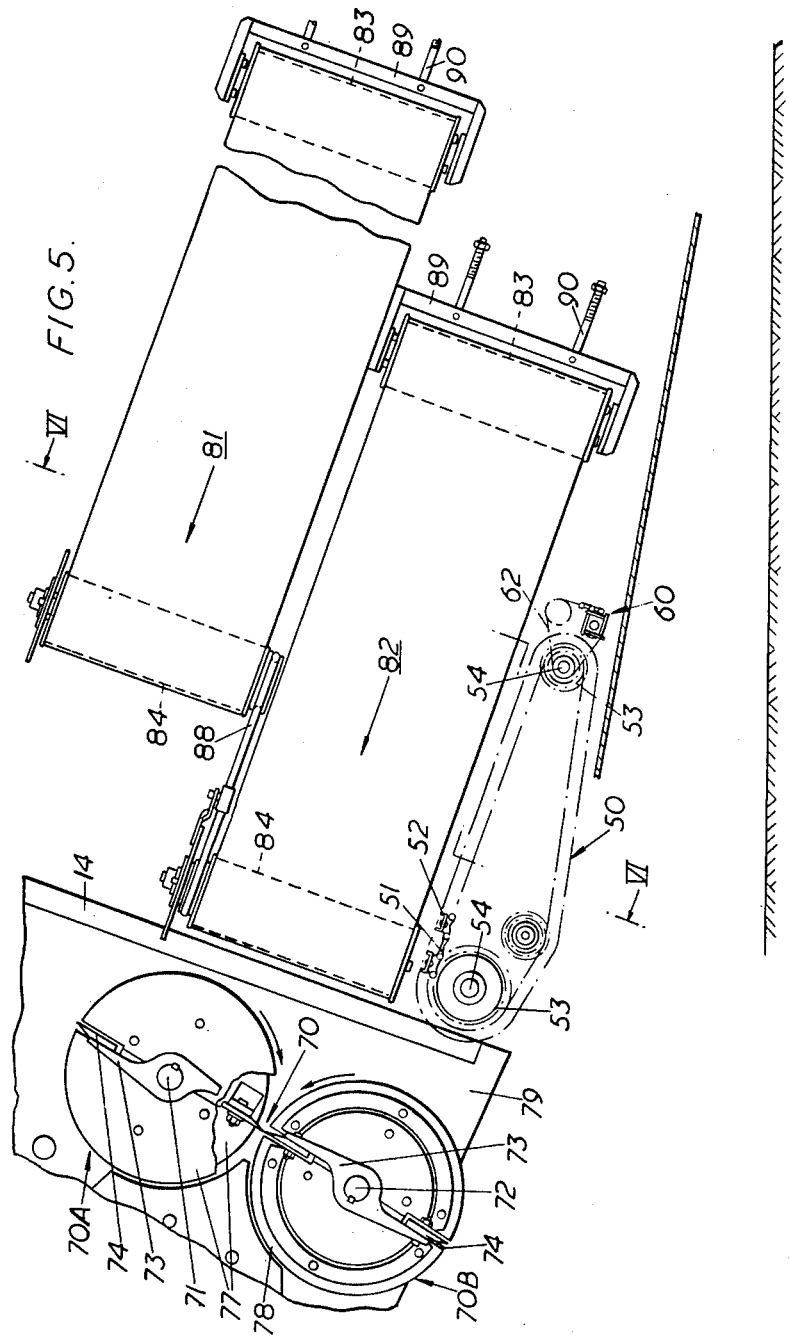

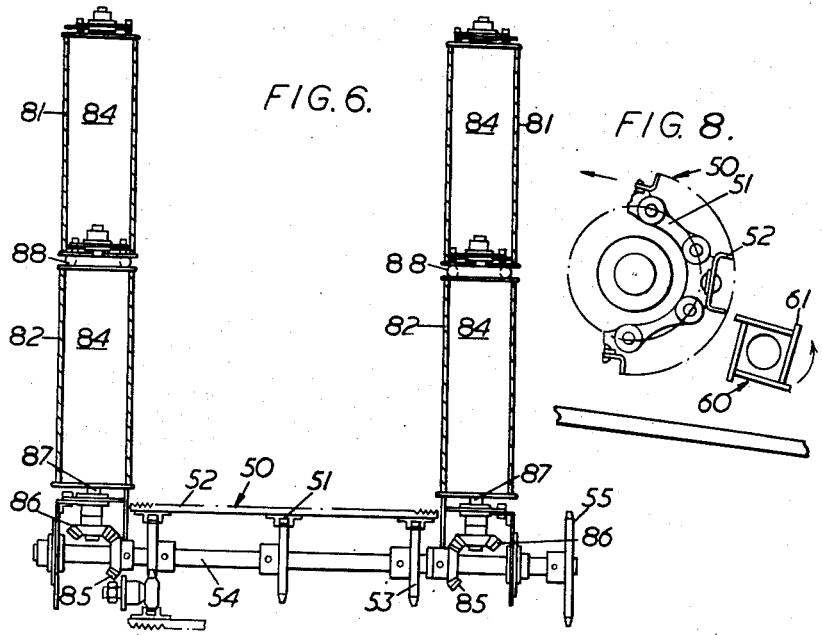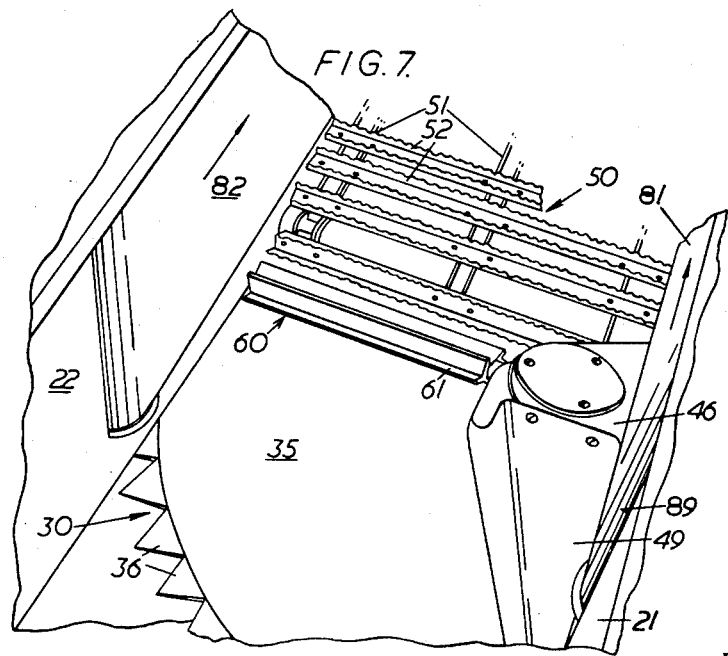

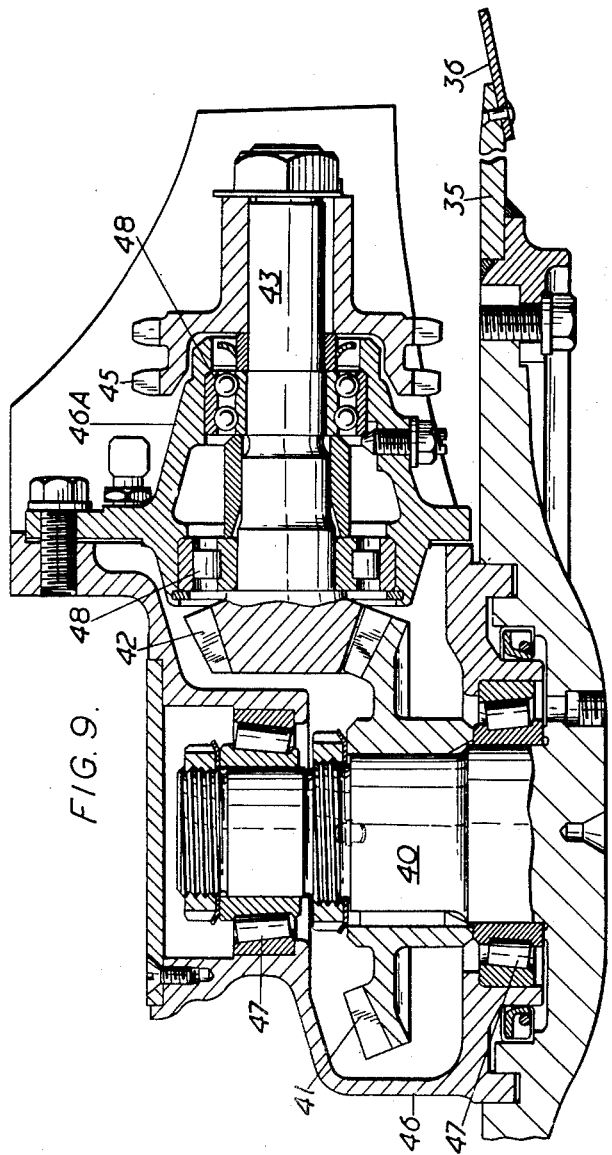

United States Patent Office 3,141,281
Patented July 21, 1964

3,141,281
MACHINES FOR HARVESTING TALL
ROW CROPS
James Kenneth Gaunt, Strathmore, Victoria, and Percival
Charles Stephens, Beaumaris, Victoria, Australia, assignors to Massey-Ferguson (Australia) Limited, Sunshine, Victoria, Australia
Filed Dec. 28, 1959, Ser. No. 862,314
Claims priority, application Australia Jan. 7, 1959
3 Claims. (Cl. 56—16)

This invention relates to machines for harvesting tall crops which are grown in widely spaced rows; sugar cane is an example of such crops.

The invention relates in particular to harvesting machines as aforesaid of the type comprising spaced vertical side walls defining a throat which is open in front, the walls being adapted to pass on opposite sides of a row of standing crops so that the row enters the throat, means for severing the butts of the stems of the crops in the progress of the machine, and means for conveying the severed crops rearwardly.

The invention includes a machine of the type stated in which the means for severing the butts is a rotary cutter of which the axis of rotation is offset from the central longitudinal plane of the throat and which works at a low level across the width of the throat.

Preferably, the rotary cutter is arranged with its axis near one of the side walls but inwardly thereof and is so rotated that its cutting edge works from said one of the side walls to the opposite side wall.

The invention also includes a machine of the type stated in which rotary means for severing the butts works at a low level across the throat and in which the means for conveying the severed crops rearwardly includes a conveyor that extends between the side walls from above the severing means and a transverse roller located between the working zone of the severing means and the front end of said conveyor, said roller being rotated so that its frontal periphery moves upwards to lift the severed butts upon the conveyor.

The invention also includes a machine of the type stated having means for chopping the stems of the crops into short lengths, or so-called "billets," and in which the conveying means includes an elevator for conveying the billets rearwardly upwards, said billet-chopping means comprising a pair of rotary assemblies having cutter blades that co-operate to perform the chopping action and both assemblies being arranged so that their axes are in a plane that is inclined forwardly upwards in order that the blades will throw the billets rearwardly upwards directly upon the elevator.

The invention will now be described by way of example with reference to the accompanying drawings as embodied in a sugar can harvesting machine. In the drawings:

FIG. 3 is a pictorial view of the harvesting machine as seen from the right hand side with various outer parts removed.

FIG. 4 is a diagrammatic view of the harvesting machine as seen from the left hand side.

FIG. 5 is a view of conveying means and associated billet-chopping means viewed from the right hand side, this view being drawn to a larger scale than FIG. 3, and FIG. 6 is a view approximately on the line VI—VI of FIG. 5.

FIG. 7 is a fragmentary perspective view from the front and left hand side of the butt severing means and associated conveying means.

FIG. 8 is a detail side view of the said conveying means and an associated roller.

FIG. 9 is an enlarged detail view, with parts removed, of the gears which drive the severing means shown in FIG. 7.

Figure 1:
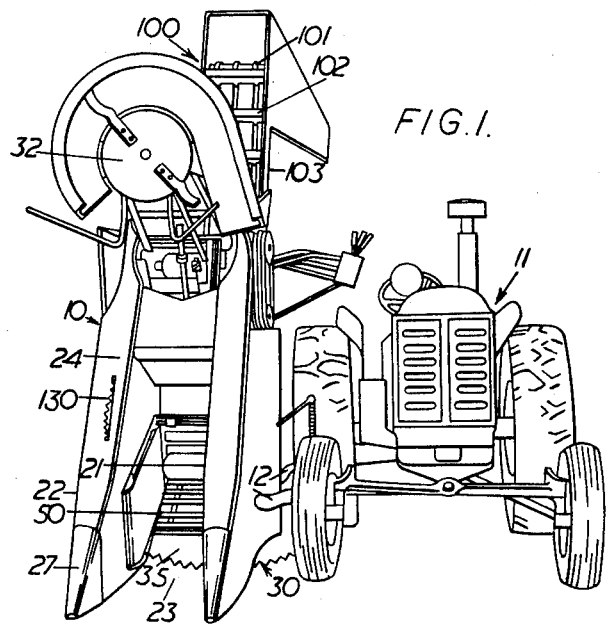
FIG. 1 is a front view showing the harvesting machine attached to a tractor.

In the drawings, certain views differ from others as regards a few constructional details. Thus, FIGS. 1, 2 and 7 differ from FIGS. 3, 5 and 6 as regards conveyors incorporated in the side walls, as hereinafter described; and FIG. 4 differs generally from the others because it is diagrammatic.

In this specification, reference is made to the standing row of crops and the severed crops as travelling rearwards through the machine, but it will be understood that this movement is rearward relatively to the advancing machine.

Figure 2:
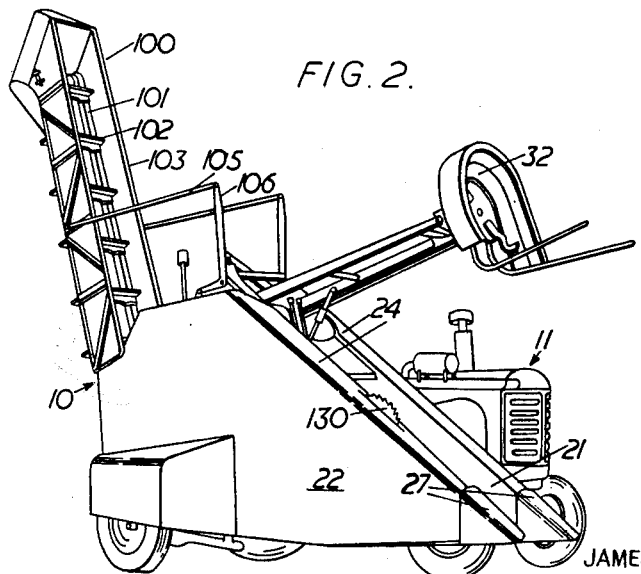
FIG. 2 is a corresponding perspective view from the front and right hand side.

Referring to the drawings, the sugar cane harvesting machine is a wheeled vehicle which is attachable to a tractor side-by-side. In FIGS. 1 and 2, the harvesting machine is indicated by 10, the tractor by 11 and the attaching means by 12.

The harvesting machine includes a wheeled base frame 13, which extends below the rear part of, and pivotally supports, a main frame 14 carrying the cutting and conveying mechanism of the harvester, and an engine 15 for driving such mechanism, through a main driving shaft 16 which is driven from the engine by belt-and-pulley gearing 17. The engine also drives, through further belt-and-pulley gearing 18, a pump 19 which is connected in a hydraulic system for lifting, lowering and supporting various parts, to some of which reference is made hereinafter. The pivotal axis of the main frame 14 is arranged transversely at or near the rear end thereof. The frame 14 is supported on the wheeled base frame 13 by a pair of cylinder-and-plunger units 20, one at each side of the machine, which are connected in the hydraulic system and are operable to tilt the frame into its raised position for transport and to lower it into its working position.

The spaced vertical side walls of the harvester are indicated by 21 and 22. The walls define an open-fronted throat 23, seen best in FIG. 1 to receive a row of standing sugar cane in the progress of the harvester. The leading edges 24, FIGS. 2 and 4, of the side walls incline rearwardly upwards. The side walls are associated with shoes 25 which have ground-engaging soles 26 and noses 27 which enclose the lower ends of the side walls 21, 22. These shoes are suspended from members 14A, 14B of the main frame 14 by parallel linkages 28 and they are liftable by a link-and-lever mechanism hereinafter briefly described. The noses 27 and side walls 21, 22 serve to pick up and raise outwardly inclined and fallen stems or sticks of sugar cane.

The means for severing the butts of the sticks in the progress of the machine is a single circular rotary cutter, which is indicated by 30 in FIGS. 1, 4 and 7 and is described hereinafter. The machine has a transverse bar 31, FIG. 4, which extends across the throat between the walls 21, 22 at a suitable distance behind the front of the machine and at a suitable height above the ground so as to engage the rearwardly moving cane sticks and tip their upper ends forwardly at or about the time that the butts thereof are severed close to the ground by the cutter 30, so that the sticks as they pass rearwardly through the machine are caused to recline substantially horizontally with their butt ends foremost as illustrated by FIG. 4.

Moreover, the machine is provided with means for cutting the tops from the standing cane. This cutting means, which forms no part of the present invention, is indicated by 32 in FIGS. 1, 2 and 4. The cutting means 32 is carried by a pivotal arm 33, FIG. 3, which can be raised, lowered and supported by a hydraulic cylinder-and-plunger unit 34 connected to the hydraulic system.

The butt severing cutter 30 consists of a single flat cutter disc 35, having a diametral size substantially greater than the width of the throat 23 and provided underneath its periphery with teeth 36 functioning as radially projecting cutter blades. This cutter disc 35 is tilted downwardly forwards at an angle of, say, about 10° to the horizontal. The cutter is so arranged that its axis of rotation is located adjacent to, but inwardly of, one of the side walls of the throat, namely the wall 21 in the example. As FIG. 9 shows, the cutter disc 35 is bolted at 37 to the rim of a central boss plate 38 which has a short upright central spindle 40. This spindle, at its upper end, is connected by bevel gears 41, 42 to the adjacent end of a short horizontal spindle 43 which is arranged at right angles to the wall 21. Each of the walls 21, 22 is of hollow construction, comprising a suitable frame structure, including the member 14A, lined on its inner, upper and outer sides with sheet metal. In FIG. 3, the sheet-metal lining is removed. In the case of the wall 21, the horizontal spindle 43 projects into the interior of the wall and is fitted with a sprocket 45 to which the cutter drive is transmitted. The sprocket 45 is the driven component of chain-and-sprocket gearing (not shown) enclosed in the side wall 21 and driven through a power-transmitting connection with the main driving shaft 16 of the machine. The cutter 30 is supported by suspensory bearings 47 in a housing 46 which is supported within the structure of the side wall 21, and the spindle 43 is journalled in bearings 48 in the cover 46A of the housing 46. The gears 41, 42 are enclosed in this housing. The housing 46 does not project greatly above the cutter disc or inwards from the wall 21 so that it does not seriously impede the rearward passage of the cane sticks through the throat 23.

As FIG. 7 shows, the housing 46 is fitted with an external shield 49 which projects forwardly and which tapers so as to merge gradually into the inner surface of the side wall 21.

The radius of the path of the cutter teeth 36 is greater than the distance between the disc axis and the opposite side wall 22, and the arrangement is such that the teeth pass below and close to the bottom of both walls 21, 22 to ensure that all cane sticks entering the throat are severed. The direction of rotation of the cutter is such that the teeth at the front thereof, i.e. on the frontal periphery of the cutter disc 35, move towards the opposite side wall 22. That is to say, the rotary cutter 30 is located at a low level with its axis offset from the central longitudinal plane of the throat so as to be much nearer to the left hand wall 21 than the opposite wall 22 by virtue of which the extent of inward projection of the housing 46 is correspondingly reduced. Moreover, that portion of the cutter which at any instant is actively severing the sticks extends across the full width of the throat 23 and works from the near wall 21 to the opposite wall 22, as indicated by the arrow in FIG. 7. Thus, the cane sticks being severed are worked from the near side wall 21, where the cutter supporting housing 46 is located, towards the opposite wall 22, so that the obstructive influence of the housing will be still further reduced and, nevertheless, there will not be excessive accumulation of crop material between the cutter and the opposite side wall 22.

The means for conveying the severed crop rearwardly comprises an endless conveyor 50, hereinafter referred to as the bottom conveyor, arranged longitudinally within the throat 23, serves to convey the severed cane sticks rearwardly from the butt severing means and its forward portion extends above the rear part of the cutter disc. The conveyor consists of a series of endless chains 51 which are bridged by an endless series of channel-section slats 52 with serrated edges, as FIG. 7 shows. The chains pass round sprockets 53 on cross shafts 54 at opposite ends of the conveyor, one of said shafts being driven by appropriate gearing, including a sprocket 55 on the driven shaft 54, from the main driving shaft 16. The rearwardly moving upper working stretch of the conveyor 50 inclines upwardly rearwards at a small angle, which may conveniently be about 15° to the horizontal plane. In order that the forward end of the upper working stretch may be disposed comparatively close to the plane of the butt cutter disc, the chain sprockets 53 at that end are of small diameter, and they are disposed close to the cutter disc.

Nevertheless, even when the said forward sprockets 53 are so small as about four inches or less in diameter, the forward end of the bottom conveyor 50 presents a substantial obstruction to the leading butt ends of the cane sticks. Accordingly, the invention additionally includes the provision of a transverse lifting roller 60, FIG. 8, immediately in front of the conveyor 50 and close to the upper surface of the butt cutter disc 35. In the example, this lifting roller is square and small in cross-section; for instance the roller may be an inch or two from side to side. The roller is rotated rapidly in the direction such that it moves upwardly at the front. Each corner of this roller is formed with a forwardly projecting flange 61 which engages and lifts the leading butt ends of the cane sticks and causes them to pass upon the upper stretch of the conveyor 50. The roller 60 is driven by chain-and-sprocket gearing 62, FIG. 5, from the forward shaft 54 of the conveyor 50.

The machine has means, indicated by 70 in FIGS. 4 and 5 for chopping the cane sticks into billets. As shown best in FIG. 5, the chopping means comprises a pair of rotary assemblies 70A and 70B which include co-operating cutting blades phased edge-to-edge which are effective to grip each cane stick, carry it rearwardly from the conveyor 50 chop it into short lengths or billets, and throw them rearwardly for collection. In the example, the assemblies 70A and 70B include a vertically spaced pair of horizontal shafts 71, 72 journalled in the main frame 14 of the machine and carrying brackets 73 on which are mounted radially disposed cutting blades 74. Two blades are mounted on each of the shafts 71, 72, being arranged at 180° from one another. These shafts are coupled by inter-meshing gears (not shown) fixed to them; the gears are of equal size so that the shafts will rotate at the same speed but in opposite directions. The shafts 71, 72 are angularly related so that the co-operating cutting blades 74 are brought into close proximity edge-to-edge during rotation of the shafts. Rotational movement of the cutting blades will draw the sticks rearwardly until the blades co-operate in chopping them. As the blades continue to rotate, they impart a kicking force to each chopped billet to throw it rearwardly.

In order to guide the cane sticks continuously through the chopping means, the shafts 71, 72 are provided with pairs of discs 77, 78 respectively, secured to the shafts near the ends of the blades 74. The discs 77 are aligned with the discs 78 so that they combine to form side walls to prevent the sticks from moving out of reach of the blades.

The main shaft 16 rotates the shafts 71, 72 through appropriate gearing (not shown).

It will be noted in FIG. 5 that the horizontal axes of the shafts 71, 72 are arranged in a plane which inclines forwardly upwards, which plane may be between 20° and 40°, say about 30°, to the vertical plane, so that the upper cutter assembly 70A is disposed somewhat forwardly of the lower cutter assembly 70B, the axis of the latter is disposed in or near the upwardly rearwards inclined plane of the upper working stretch of the bottom conveyor 50. The aforesaid disposition of the cutter assemblies 70A, 70B results in the cane billets being thrown rearwardly upwards at the stated angle of about 30° to the horizontal plane.

A gap is left at 79 between the bottom conveyor 50 and the lower rotary assembly 70B through which gap stones entrained with the cane sticks can drop to the ground.

In order further to assist in feeding the cane sticks to the billet chopper 70 a rotary feed roller 80 is arranged above and in front of the upper rotary assembly of the chopper. The roller 80 is rotated so that its lower periphery moves rearwardly. This feed roller may be comparatively large in cross-sectional size and is preferably of pentagonal or other polygonal form. For example, the diagonal size across the corners of this feed roller may be about eighteen inches.

Each of the vertical side walls 21, 22 defining the throat 23 is provided with one or more longitudinally extending endless belt conveyors, having their inner working stretches arranged in vertical longitudinal planes and being so located that each such stretch is substantially flush with the inner surface of the associated wall so that in effect the conveyor forms a rearwardly moving portion of the wall.

In the example according to FIGS. 3 to 6, each side wall 21, 22 has two such belt conveyors, namely an upper conveyor 81 and a lower conveyor 82 which extends rearwards beyond the upper conveyor to a position in close proximity to the billet chopper 70. Both conveyor belts are led around rotatable drums 83, 84 the axes of which are inclined forwardly upwards at about 30° to the vertical. In each wall, the rear drum 84 of the lower conveyor 82 is driven through inter-meshing bevel gears 85, 86, FIG. 6, one of which is secured to the shaft 87 of the drum and the other of which is secured to the cross shaft 54 that drives the bottom conveyor 50. In each wall, the rear drum 84 of the upper conveyor 81 is driven by a belt-and-pulley gear 88, FIG. 5, from the rear drum of the associated upper conveyor 81. When viewed from the side, the wall conveyors are inclined upwardly rearwards at the same angle as the working upper stretch of the bottom conveyor 50 and the lower edge of each lower conveyor 82 is disposed close to the plane of said upper stretch.

The forward conveyor drums 83 of the several wall conveyors are journalled in yokes 89 which are positioned by screw-adjustment devices 90 for regulating the tension of the conveyor belts.

The inner sheet-metal lining of each side wall 21, 22 is formed with an opening 89, FIG. 7, in which the respective wall conveyor is arranged, the outer inactive stretch thereof and the drums and gearing and associated parts are all arranged within the interior of the wall.

In each side wall, the arrangement of the wall conveyors is such that the rear end of the lower conveyor 82 extends below the aforesaid feed roller 80 and terminates close to the upper rotary assembly of the billet chopper 70, whereas the upper wall conveyor 81 extends from a place in front of the butt cutter 30 to the front of the periphery of the feed roller 80.

The cane sticks are thus conveyed from the butt cutter 30 to the billet chopper 70 by the bottom conveyor 50, the two side conveyors 81, 82 in each wall and by the feed roller 80 which engages the upper surface of the layers of sticks. It will be apparent therefore, that the rearwardly moving sticks will be crowded together, so that they interlock to some extent and so that the sticks which, for the time being pass through and are pulled rearwardly by the billet chopper will pull the adjacent sticks with them. Thus, the billet chopper is largely if not chiefly responsible for the rearward movement of the cane sticks.

If desired, only a single wall conveyor, say the conveyor 82, may be provided in each wall, as in the example according to FIGS. 1, 2 and 7. Moreover, if desired, only one wall, namely the wall 22, may be provided with one or two conveyors.

The harvester also includes an elevator 100 for conveying the chopped billets rearwardly upwards. In the example, this elevator is of the same general construction as the bottom conveyor 50, consisting of endless sprocket-driven chains 101 and channel-section slats 102.

The working stretch of this elevator works rearwardly upwards along a passageway provided by a long frame 103, the lower end of which is pivotally connected at 104 to the main frame 14. The elevator is arranged to extend at a steep inclination from the proximity of the billet chopper 70, the arrangement being such that the billets thrown rearwards at an upward inclination by the pairs of co-operating blades 74 are received directly upon the elevator at a level well above its lower end, as FIG. 4 illustrates, so that they are carried upwardly by the slats 102. It is therefore unnecessary to provide a hopper or boot at the lower end of the elevator to receive the billets so that the bottom of the elevator can be advantageously arranged at a low level. This low disposition of the lower end of the elevator enables the billet chopper 70 to be correspondingly low and this in turn permits the chopper to be disposed close to the butt cutter 30, because the butt ends of the severed cane sticks do not require to be raised to a major extent in order to enter the billet chopper. Consequently the machine may be of low and compact and lightweight construction, and as such may be designed for easy manoeuvrability.

The elevator 100 is adapted to be moved angularly about its pivotal connection 104 in order that it may be arranged in an upright position for convenience in transport. For this purpose, the opposite sides of an upper part of the elevator frame 103 are connected by forwardly extending pivoted links 105 to the rear ends of arms 106 secured to a transverse rock shaft 107 journalled on upper parts 408 of the main frame 14 of the machine. The rock shaft is turnable by means of a hydraulic cylinder-and-plunger unit 109 connected in the hydraulic system. The unit 109 acts on an arm 110 secured to the rock shaft.

As previously stated, the shoes 25 are liftable by a link-and-lever mechanism. This mechanism, for each shoe, comprises links 111, 112 and an intermediate lever 113, which is fulcrummed at 114 on a member 14C of the main frame 14. Opposite ends of the links 113, 114 are pivotally connected to the associated shoe and one of two side arms 115 on the rock shaft 107. The arrangement is such that when the unit 109 is extended to raise the elevator 100 into its transport position, the shoes 25 are simultaneously swung on their suspensory linkages 28 clear of the ground.

There may be provided in association with the elevator 100 a wheeled receptacle 121, FIG. 4, supported on rails 122 that extend rearwards from the wheeled base frame 13, and adapted to receive the billets as they are discharged downwards from the elevator by way of a chute 123.

The front edge 24 of the right hand wall 22, which is at the "crops" side of the machine (namely, the side adjacent the still standing sugar cane in the field and opposite the tractor 11) has additional means for cutting off any sugar cane tops which may bend outwards over said wall out of reach of the cutting means 32. The additional means provided consists of a rotary horizontal-axis disc cutter 130 with a serrated cutting edge. This cutter is journalled in the interior of the wall 22, the serrated periphery projecting only slightly through a slot in the wall front. The cutter is rotated from the main driving shaft 16 through gearing which includes belt-and-pulley gearing 131.

We claim as our invention:

1. In a harvester for tall row crops, the combination comprising, a frame, a pair of laterally spaced side walls on said frame defining a forwardly opening crop receiving throat, a housing on and projecting inwardly from the inner side of one of said side walls, a rotary cutter journalled beneath said housing for rotation about a generally vertical axis, said cutter defining a solid floor extending between said side walls for supporting the butt ends of severed crop material, means for driving said cutter so that its forward cutting periphery cuts from said one side wall across said throat to the other side wall, and a shield about said housing for guiding crop material entering said throat about said housing.

2. In a harvester for tall row crops, the combination comprising, a wheeled frame, a pair of laterally spaced side walls on said frame defining a forwardly opening crop receiving throat, a rotary cutter journalled on one of said side walls for rotation about a generally vertical axis, said cutter defining a solid floor extending between said side walls for supporting the butt ends of severed crop material, means for driving said cutter so that its forward cutting periphery cuts from one side wall across said throat to the other side wall, an endless conveyor mounted in said frame so as to run rearwardly and upwardly from a point above said rotary cutter, a lifting roller journalled transversely between said side walls just above said solid floor and in front of said conveyor, and means for driving said roller so as to lift crop material severed by said cutter onto said conveyor.

3. In a harvester for tall row crops, the combination comprising, a frame, a pair of laterally spaced side walls on said frame defining a forwardly opening crop receiving throat, a rotary cutter journalled on one of said side walls for rotation about a generally vertical but forwardly tilting axis, means for driving said cutter so that its forward cutting periphery cuts from one side wall across said throat to the other side wall, said cutter being formed of a circular disk defining a solid floor extending between said side walls and having radially extending cutting blade teeth, an endless conveyor mounted in said frame so as to run rearwardly and upwardly from a point above the disk portion of said cutter, a lifting roller having axially extending flanges journalled transversely between said side walls so that said flanges rotate just above said solid floor and in front of said conveyor, and means for driving said roller so as to lift crop material severed by said cutter onto said conveyor.

References Cited in the file of this patent

UNITED STATES PATENTS

| | | |
|---|---|---|
| 1,990,172 | Falkiner et al. | Feb. 5, 1934 |
| 2,348,634 | McEachern | May 9, 1944 |
| 2,367,278 | Hewlett | Jan. 16, 1945 |
| 2,634,569 | Raney et al. | Apr. 14, 1953 |
| 2,808,865 | Duncan | Oct. 8, 1957 |
| 2,826,031 | Hansen | Mar. 11, 1958 |
| 2,953,886 | Douglas et al. | Sept. 27, 1960 |